US006377988B1

(12) United States Patent
Spector et al.

(10) Patent No.: US 6,377,988 B1
(45) Date of Patent: Apr. 23, 2002

(54) CONTROLING ELEMENTS OF A TELECOMMUNICATIONS NETWORK

(75) Inventors: Adam Spector, London; Paul Abraham, Croydon, both of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 08/836,301

(22) PCT Filed: Nov. 7, 1995

(86) PCT No.: PCT/GB95/02617

§ 371 Date: Jun. 11, 1997

§ 102(e) Date: Jun. 11, 1997

(87) PCT Pub. No.: WO96/15635

PCT Pub. Date: May 23, 1996

(30) Foreign Application Priority Data

Nov. 10, 1994 (GB) .............................. 9422722

(51) Int. Cl.[7] ........................ G06F 15/16; G06F 15/177
(52) U.S. Cl. ........................ 709/224; 709/209; 709/221
(58) Field of Search ................. 340/825.06, 825.07; 395/200.54, 200.55, 200.56, 200.68, 200.74; 379/220, 221; 709/224, 225, 226, 238, 244, 223, 220, 221, 209

(56) References Cited

U.S. PATENT DOCUMENTS 4,419,667 A * 12/1983 Gurr et al. ............. 340/825.06
4,611,320 A *  9/1986 Southard
5,008,879 A *  4/1991 Fischer et al. ............. 370/401

(List continued on next page.)

FOREIGN PATENT DOCUMENTS

WO    WO A 93 18598    9/1993

OTHER PUBLICATIONS

Rabie, "Evolution to Multivendor Intelligent Network Management", International Switching Symposium 1992, Session C1, Paper 1, vol. 1, Oct. 25, 1992, Yokohama, JP, pp. 60–64, XP 000337617.

Liao et al, "Toward the Intelligent Integrated Network Management", Globecom '90, Session 802, Paper 6, vol. 3, Dec. 2, 1999 San Diego, US, pp. 1498–1502, XP000218826.

Cameron et al, "Integrated Network Operations Architecture and Its Application to Network Maintenance", IEEE Communications Magazine, vol. 25, No. 8, Aug. 1987, New York, US, pp. 48–53.

Garrison et al, "The BT Network Traffic Management System: a Window on the Network", British Telecommunications Engineering, vol. 10, No. 3, Oct. 1991, London, GB, pp. 222–229, XP000279042.

Hong et al, "Design and Implementation of A Generic DIStributed Application Management System", Globecom 93, vol. 1, Nov. 29, 1993, Houston, US, pp. 207–211, XP 000428055.

Kiriha et al, "An Automatic Generation of Management Information Base (MIB) For OSI Based Network Management System", Globecom 91, Session 19, Paper 5, vol. 1, Dec. 2, 1991, Phoenix, US, pp. 649–653, XP 000326045.

*Primary Examiner*—Mark H. Rinehart
*Assistant Examiner*—Marc D. Thompson
(74) *Attorney, Agent, or Firm*—Nixon & Vanderhye P.C.

(57) ABSTRACT

A plurality of elements of a system, such as a telecommunications network are controlled by generating a generic instruction, in a generator selecting the element for which the instruction is directed, in a matcher and interface module and transmitting the instruction to the respective elements. By transmitting a generic instruction applicable to all relevant elements the operator of the system can control all the elements with a single instruction. A generic instruction can be translated in translators into separate instructions applicable to each individual element or defined groups of elements.

23 Claims, 5 Drawing Sheets

U.S. PATENT DOCUMENTS

| | | | | |
|---|---|---|---|---|
| 5,182,750 A | * | 1/1993 | Bales et al. | 379/221 |
| 5,193,152 A | * | 3/1993 | Smith | 709/220 |
| 5,237,561 A | * | 8/1993 | Pyhälammi | |
| 5,317,742 A | * | 5/1994 | Bapat | 395/680 |
| 5,420,916 A | * | 5/1995 | Sekiguchi | 379/230 |
| 5,426,421 A | * | 6/1995 | Gray | 709/223 |
| 5,533,116 A | * | 7/1996 | Vesterinen | 379/243 |
| 5,583,928 A | * | 12/1996 | Tester et al. | 379/220 |

* cited by examiner

| SWITCH | LOCATION | TYPE |
|--------|----------|------|
| A1 | X | A |
| A2 | Y | A |
| B1 | X | B |
| B2 | X | B |
| B3 | Z | B |
| C1 | Y | C |

Fig.4.

| LINE | TERMINATIONS | |
|------|------|------|
| 1 | A2 | B1 |
| 2 | A2 | C1 |
| 3 | B3 | C1 |
| 4 | A1 | B3 |
| 5 | A1 | B1 |
| 6 | B1 | B2 |
| 7 | A2 | B2 |
| 8 | A2 | C1 |
| 9 | B2 | B3 |
| 10 | A1 | B2 |

# CONTROLING ELEMENTS OF A TELECOMMUNICATIONS NETWORK

BACKGROUND OF THE INVENTION

1. Field of the Invention

This invention concerns controlling elements of a telecommunications network, particularly but not exclusively for traffic management.

2. Related Art

Although modern telecommunications networks are highly automated, they still require some monitoring and centralised control in order to deal with unusual circumstances such as overload conditions. A typical instance is a sudden surge in the number of calls made to a given telephone number, perhaps as a result of the number being given out on a television broadcast in an advertisement, during a phone-in show, or if an emergency contact number is given out on a news bulletin reporting a major accident or natural disaster.

The effect of such surges is to overload not only the line directly involved, but also the local exchange (also known as a switch) serving it. This results in calls to and from all subscribers served by that switch failing because all trunk lines serving the switch are busy with call attempts to the one number, most of which will fail.

The concepts of destination volume controls such as call blocking and call-gapping have been developed to overcome this problem. Call blocking arranges that a proportion of calls to a target number are failed by the originating exchange. Call gapping arranges that, after a call attempt is made to a target number, no further call attempts can be made to that number until a predetermined interval has elapsed. Both these systems reduce unnecessary use of the trunk network by failed call attempts.

A problem which arises in applying centralised control to a telecommunications network is that, in a typical network, exchanges are not identical. This is because in a developing network, at any given time, more than one type of exchange will be in use. Moreover, the different characteristics of the areas served by different exchanges may make different types of exchange appropriate in different locations. Consequently, certain functionality may only be available to certain exchanges or, even where the functionality is universal, individual instructions may be required to operate them. It is therefore necessary to tailor the instructions for each exchange. Furthermore certain services, such as call-gapping and call blocking, may be required only for a selected subset of exchanges, such as those serving the area in which the number has been broadcast.

It is known, for example from patent specification no. WO93/18598 (Nokia), to generate a command for a network element in a generic protocol which is translated into the appropriate protocol for the network element concerned. However it is necessary for the user of this system to transmit a command in the generic protocol for each element to be controlled. This can be time consuming and problematic, for example if several exchanges are required to co-operate and some of them do not have the necessary functionality.

SUMMARY OF THE INVENTION

According to a first aspect of the invention, there is provided a method of controlling a plurality of elements of a telecommunications network, comprising the steps of generating a generic instruction, selecting the elements for which the instruction is directed, and transmitting the instruction to the respective elements.

According to a second aspect of the invention, there is provided a controller for a telecommunications network having a plurality of functional elements, comprising means for generating a generic instruction, and means for transmitting the instruction to the respective elements, characterised in having means for selecting the elements to which the instruction is directed.

By transmitting a generic instruction applicable to all relevant elements, the operator of the system can control all the elements with a single instruction. A generic instruction can be translated into separate instructions applicable to each individual element or defined groups of elements.

Certain elements may not have the ability to carry out certain functions, accordingly the method may provide that if one or more of the selected elements is not capable of performing the required instruction no instruction is transmitted to that element or elements. However, the ability of the network as a whole to carry out the desired functions may be dependent on the ability of each individual element to carry out a predetermined function. The method may therefore provide that, if any element is incapable of performing the required instruction, no instruction is transmitted to any of the elements. In other words, no instruction is transmitted to any element unless all the elements required to co-operate can carry out their individual instructions. Alternatively, certain network functions may be performable by parts of the network independently of the ability of other elements to do so, so the method may provide that if any elements are incapable of performing the instruction, the instruction is sent only to the elements which are capable of performing the instruction.

Different compatibility criteria may be used for different network functions.

In a preferred arrangement instructions may be prepared and stored for onward transmission in response to a predetermined condition. This allows the network to respond automatically and promptly to a condition such as a localised overload occurring in the system.

The predetermined condition may be the expiry of a pre-set time interval, allowing advance scheduling of network controls. For regular events, such as weekly or daily 'phone-in' programmes, the time interval may be re-set after each transmission of the instruction. However, for one-off situations such as special events the time interval is not re-set.

The instructions to the network elements may be arranged to cause the inhibition of a signalling function. For example, if calls to a single number are overloading the system, and that number is subject to a number translation process (for example converting a toll-free number to an exchange number), calls to that number can be gapped or blocked by inhibiting call set-up signals being sent to the number translation network element. This prevents abortive call set-up attempts clogging the signalling network, as well as freeing the traffic network itself.

In a preferred embodiment, the method comprises the steps of generating an instruction in high-level language, a selection pattern output, and an interface type message, converting the high-level instruction into instructions in formats compatible with each of a respective element type; and comparing the selection pattern data with stored information to select the elements to which the instruction is to be sent.

BRIEF DESCRIPTION OF THE DRAWINGS

Embodiments of the invention will now be described by way of example, with reference to the figures, in which.

DETAILED DESCRIPTION OF EXEMPLARY EMBODIMENT

Figure 1A:
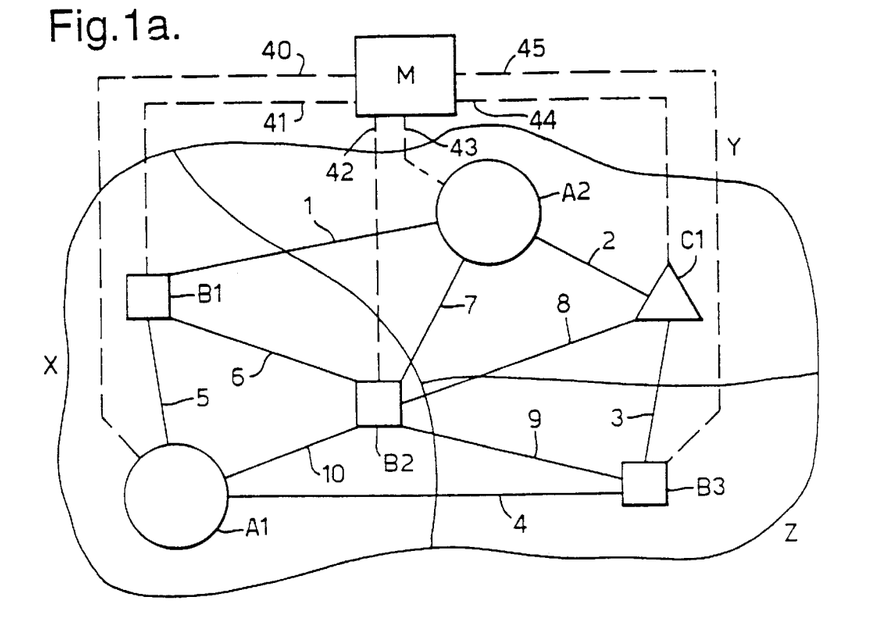
FIG. 1a shows a simple telecommunications network controlled by 3 network manager, illustrating one arrangement according to the invention.

FIG. 1a shows a simple telecommunication network having six switches (exchanges) A1, A2, B1, B2, B3, C1 all operating under the centralised control of a network manager M. The switches are interconnected by traffic-carrying links (1, -2, 3, 4, 5, 6, 7, 8, 9, 10; solid lines) and each switch is connected to the network manager M by a respective control link (40, 41, 42, 43, 44, 45: dotted lines).

Figure 1B:
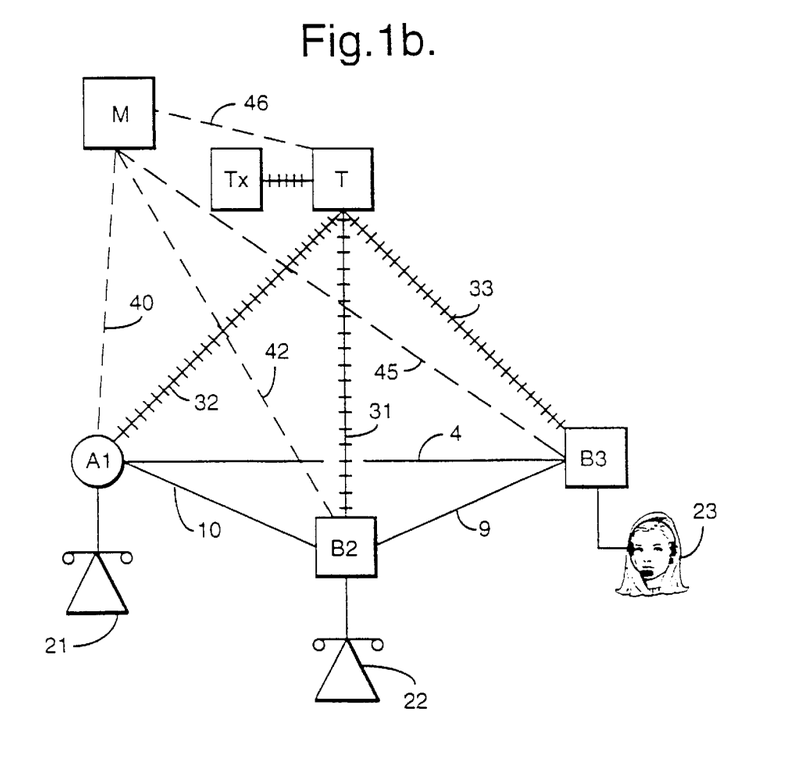
FIG. 1b is a diagram of a telecommunications network having a separate signalling network, illustrating a further arrangement according to the invention.

FIG. 1b shows a variant of FIG. 1a. Only three exchanges A1, B2, B3 are shown for simplicity, connected, as in FIG. 1a, by a traffic network 4, 9, 10 and also by a signalling network 31, 32, 33 to a signalling element T which includes a number translator Tx. The exchanges A1, B2, B3 and signalling element T are under the control of the network management centre M, by means of links 40, 42, 45, 46 respectively. Each exchange A1, B2, B3 is connected to a number of user terminals (only one shown in each case, 21, 22, 23 respectively).

Figure 2:
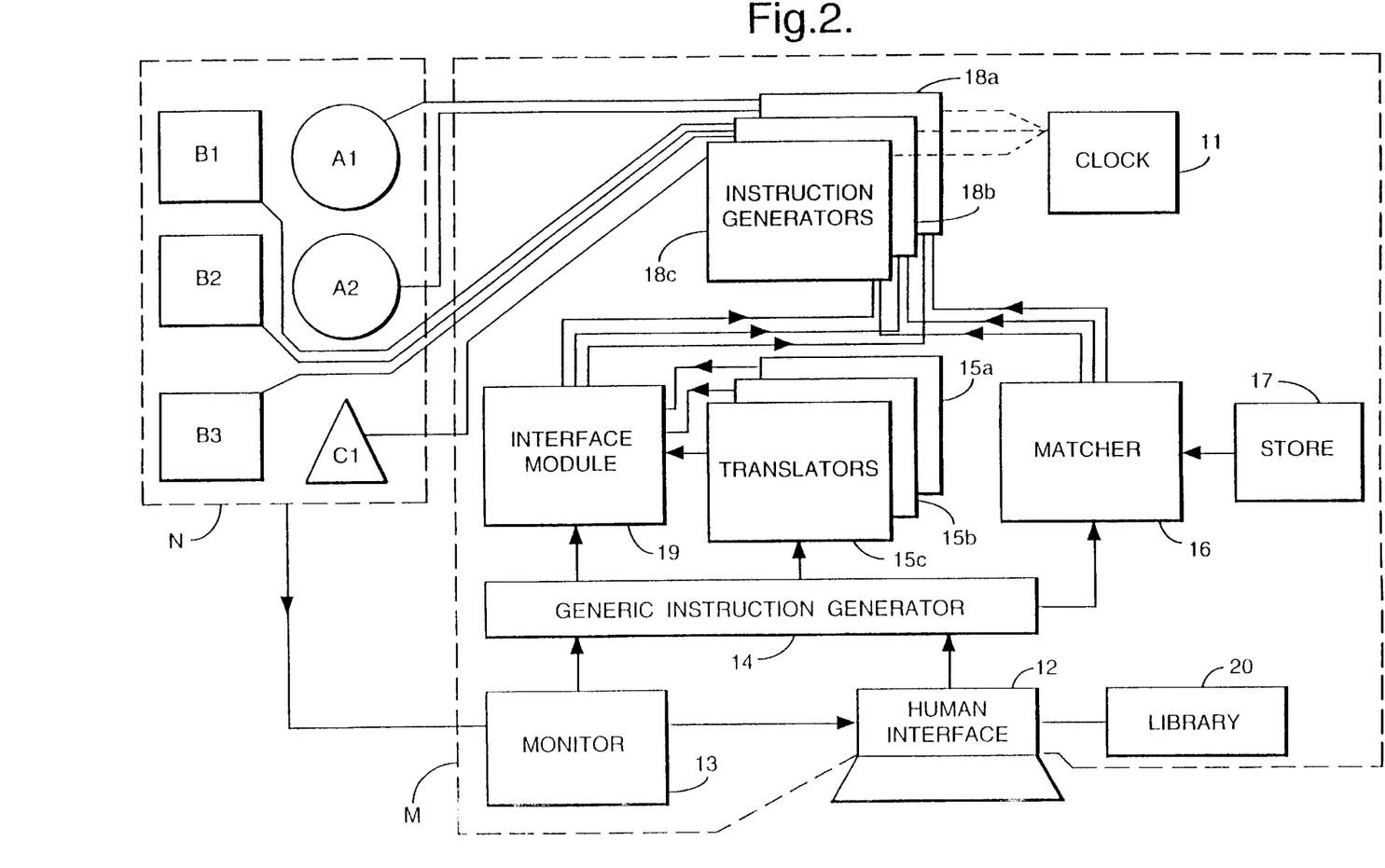
FIG. 2 shows the functional components of a network manager embodying the present invention and their relationship with a number of switching centres.

The functional components of the network manager M which embody the invention, and their relationship to the network are illustrated in FIG. 2. It includes a store 17 which stores various attributes relating to the switches and the links between them. Such attributes include the types of equipment installed at each switch (in this example identified as type A, type B and type C which may for example be the System X, AXE 10 and 5ESS types currently in use by British Telecommunications plc) and the geographical location (in this example identified as area X (centres A1, B1, B2), area Y (centres A2, C1) and area Z (centre B3). These areas may be defined by any suitable criterion or combination of such criteria. For example, a television coverage area may be appropriate for defining the switches to be controlled for call-gapping purposes when a phone-in number is broadcast, whilst for an enquiry line for a utility service such as transport, power, water etc. call-gapping may be required according to that utility's regional structure. More than one such geographical overlay may be defined. The data stored in store 17 may also include data on the current state of the elements, updated by input from the network elements.

The construction of network managers is well known to those skilled in the art. Typically a network manager is embodied by a computer whose software provides the necessary functional components.

The network manager M has three types of input, namely a time indication from a clock 11, a human interface 12 and a monitor 13 which receives inputs from the network N and either transmits a message to the operator by means of the human interface 12 or generates an automatic response from the network manager. The human interface 12 is associated with a network traffic control library 20 in which may be stored standard input formats.

A generic instruction generator 14 receives inputs from the human interface 12 and the monitor 13. The generic instruction generator 14 provides three outputs: an instruction in high-level language which is passed to a group of translators 15a, 15b, 15c, a selection pattern output which is passed to a data matcher 16, and an interface type message transmitted to an interface module 19. The translators 15a, 15b, 15c are each configured to convert the high-level instructions received from the generic instruction generator 14 into an instruction in a format compatible with a respective switch type A, B or C. The data matcher 16 receives selection pattern data from the generic instruction generator 14 and compares this data with the information stored in store 17 in order to select the switches to which the instruction is to be sent. The data stored in the store 17 can be updated in response to inputs from the network N through the monitor 13.

Figure 3:
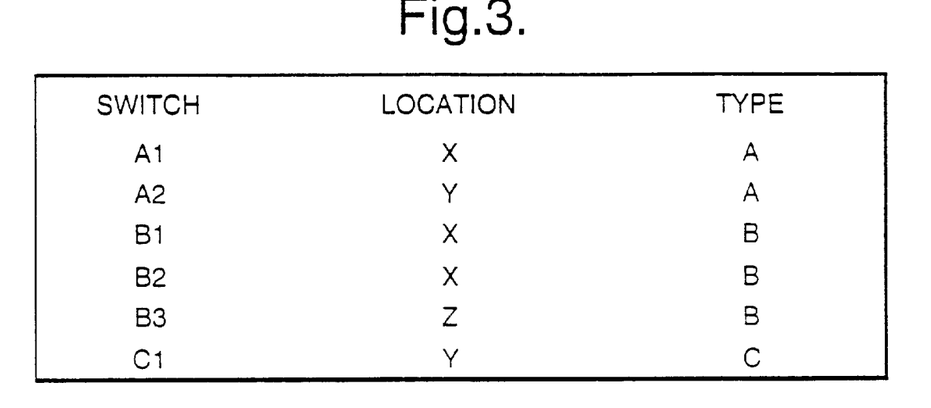
FIGS. 3 and 4 show simplified details of the store element 17 of FIG. 2.
Figure 4:
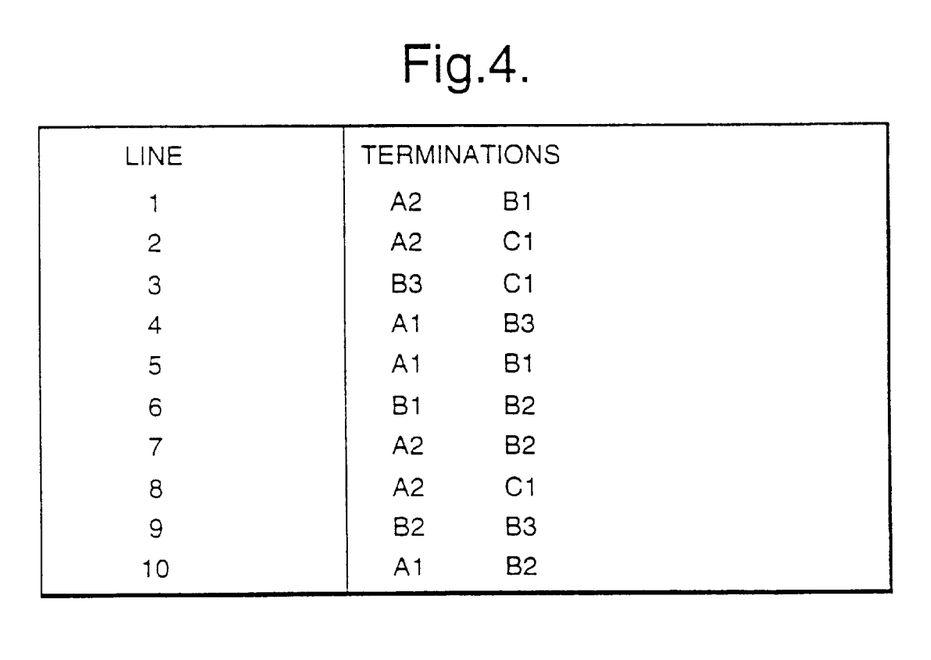

FIGS. 3 and 4 show the organisation of data in the store 17.

FIG. 3 shows the data stored for the switches A1, A2, B1, B2, B3, and C; by geographical area and type of switching equipment. As well as these inherent characteristics, the store 17 may also hold data relating to the current condition of the switches.

FIG. 4 shows similar inherent data held for each link (1 to 10) in the system. This data includes the termination points and the capacity of each link.

An instruction generator 18a, 18b, 18c is provided for each type of switch A, B, C. Each instruction generator 18a, 18b, 18c receives data from the matcher 16, the clock 11 and, via the interface module 19, the respective translator 15a, 15b or 15c, from which instructions are generated for transmission to appropriate elements of the network N.

The instructions may be transmitted by the instruction generators 18a, 18b, 18c immediately, or at one or more predetermined times under the control of the clock 11. For example, the instructions may be transmitted to the network N on a regular basis, such as at a predetermined time and day of the week to coincide with the broadcast times of a phone-in television or radio show.

The interface module 19 ensures that a generic instruction which requires the co-operation of two or more switches is compatible with all the switches involved. The interface module 19 controls the operation of the instruction generators 18, 18b, 18c in the event that the instruction required is incompatible with the capabilities of one or more types of switch A, B or C. Such an incompatibility would be identified by the respective translator 15a, 15b or 15c, which transmits an error message to the interface module 19 should the instruction not be executable. The generic instruction generator 14 transmits an interface-type message to the interface module 19 which controls the operation of the instruction generators 18a, 18b, 18c. The interface-type message can be one of three types:

i) AND: all switches to which the instruction is addressed must be capable of executing the instruction: if any switch is not so capable the instruction is not carried out at all ii) OR: any switch to which the instruction is addressed and which is capable of executing the instruction does so, even if other switches cannot do so.

iii) CONDITIONAL: an instruction to control routes between switches is executable only in respect of those routes for which all switches controlling that route are compatible with the instruction.

A message is transmitted to the human interface 12 to indicate whether, or to what extent, the instruction can be executed.

The operation of the network manager M will now be described with reference to FIGS. 1a and 2. In this illustrative example, the function to be controlled is call-gapping, to be initiated at a set time once a week or in response to an overload condition detected by the monitor 13. For the sake of this illustration, it will be assumed that call-gapping is only required for switches in geographical areas X and Y, and that equipment of type A is not capable of providing call-gapping functionality.

The human operator provides an input through the human interface 12 to the generic instruction generator 14. This input identifies the function required (call-gapping), the proportion of calls to be gapped, the geographical area to be covered (in this example zones X and Y), and the time that the function should operate (for example with immediate effect until manually cancelled, or from 1900 to 2030 every Tuesday, or in response to an external stimulus such as an overload detected by the monitor 13).

The generic instruction generated in the generator 14 is transmitted to th(bank of translators 15a, 15b, 15c which each translate the instruction into a form which can be handled by a respective switching system type A, B, C. In this case type A is incapable of performing call-gapping so an error message is generated by the translator 15a.

The generic instruction generator 14 has two further outputs. Firstly, it transmits the selection criteria to the matcher 16. In this case, the switches to be call-gapped are selected by geographical area. The selection of the set of switches to be selected may be done on the basis of the intrinsic architecture of the network, e.g. a set may comprise a DMSU (digital main switching unit) and its daughter DLEs (digital local exchanges). Alternatively the set may be manually selected, in order to meet a non-intrinsic criterion such as the coverage area of a television station, or the administrative regions of a utility company. These criteria are compared in the matcher 16 with the stored details held in the store 17, and the identities of the switches which meet the criteria are transmitted from the matcher 16 to the bank of instruction generators 18a, 18b, 18c. In the present example, the identities of the switches A1 and A2 are transmitted to the instruction generator 18a, the switches B1 and B2 to the instruction generator 18b, and the switch C1 to the instruction generator 18c. The identity of the switch B3 is not transmitted to instruction generator 18c because it is in zone Z and therefore does not meet the geographical requirement.

The other output from the generic instruction generator 14 relates to the type of instruction, and is transmitted to the interface module 19. This output identifies to the interface module 19 whether the operation should be partially executed even if some switches lack the necessary functionality. In the case of call-gapping or call blocking the operation can be partially executed in this way, so the interface module 19 transmits the instructions generated by the translators 15b and 15c to the respective instruction generators 18b, 18c, but transmits no instruction to the instruction generator 18a as only an error message was received from the translator 15a.

If the generic instruction cannot be carried out unless all relevant switches can co-operate, the arrival of an error message from any one of the translators 15a, 15b, 15c prevents the interface module 19 from transmitting any instruction to any of the instruction generators 18a, b, c.

If the generic instruction requires a route to be established between a first switch having the required functionality and a second switch lacking that functionality the route is not established. However, this does not prevent the first switch establishing routes to other switches in accordance with the generic instruction, provided these other switches have the required functionality.

The instructions generated in the instruction generator 18b, are transmitted to the switches B1 and B2, and the instruction generated in the instruction generator 18c is transmitted to the switch C1. The instructions are transmitted under the control of the clock 11, at the times programmed by the generic instruction generator 14.

Thus, by the input of a single instruction by the human operator or automatically through the monitor 13 the required function can be performed by all switching elements having suitable functionality within the geographical area specified, without the human operator needing to generate separate instructions for each type of switch or to specifically identify the switches to be controlled.

In the arrangement shown in FIG. 1b the system is configured so that the signalling network 31, 32, 33 is prevented from overloading with unsuccessful call attempts. Call set-up signals are carried over the signalling network 31, 32, 33 in order to set-up the necessary connections in the traffic network 4, 9, 10 between the exchanges A1, B2, B3. The user 23 is subject to a number translation service carried out by a number translator Tx in the signalling element T. In other words, the users 21, 22 can call the user 23 using a special number (e.g. a toll-free number) which is translated by the translator Tx to control the signalling element T to set-up a call to the user 23.

If an overload of calls using the special number is observed or predicted, the network manager M can control the switches A1, B2, B3 to inhibit the transmission over the signalling network 31, 32, 33 of call requests to that number. This releases capacity not only in the traffic network 4, 9, 10, but also in the signalling network 31, 32, 33. If one of the switches (e.g. A1) does not have the capability to inhibit the transmission of such call requests, they can still be inhibited by the network manager M at the signalling element T. This does not prevent unsuccessful call requests appearing on the signalling link 32, between the exchange A1 and the signalling element T, but it does prevent them propagating over the rest of the network.

The normal sequence of operation of the system will now be described. It may be viewed as consisting of three distinct processes: control definition, control scheduling, and control implementation. Firstly, users define pre-planned controls (PPCs) by specifying the type of control (e.g. destination call gapping) and optionally the values of the control parameters and the control target.

Once defined, the PPC may be saved in the network traffic control library 20 for later use or may be scheduled.

The primary function of the library 20 is to provide a repertoire of PPCs which may be quickly retrieved to deal with network problems.

PPCs in the library 20 may be retrieved for control scheduling. Users schedule a PPC by selecting one from the library 20 and specifying the schedule details and if necessary the control target and control parameters may be added (if they are not already defined), or changed (if they are defined). The PPC in the library 20 is not affected. Once scheduled, the control is entered onto the list of currently scheduled controls.

Scheduled controls may be positively authorised at any time within N minutes of their due implementation (where N is a pre-defined parameter), otherwise the control will not be implemented. If authorisation is not given within the pre-defined time period specified by N a report is generated.

Authorised controls are automatically implemented (inserted and removed) according the schedule attached to the PPC. Users can monitor the progress of controls implementation in real-time.

The network traffic control library 20 allows users to build up and maintain a repertoire of PPCs. This allows users to save time by having access to templates to commonly used controls (e.g. to deal with focused overloads) where only the control target is different. It also allows the accurate implementation of a prepared complex sequence of controls. Network problems which require the fast and accurate deployment of a number of controls can be dealt with promptly. The library 20 may also be used as a source from which to build new controls.

There are three types of library entries:
1. basic PPC (with a single exchange/route control target)
2. basic PPC (with an exchange set control target)
3. linked PPC The control targets may be specified, or may be left for the user to select. A linked PPC consists of a sequence of PPCs. PPCs may be stored with all or only some of the control parameters and the control target blank. The network manager will check that a PPC is fully specified when it is selected for scheduling.

A basic PPC with a single exchange/route as a control target is the simplest type of control. A basic PPC with an exchange set as a control target is also referred to as a broadcast control. These two types of basic PPCs are only distinguishable when the control target is specified.

A broadcast control is a control which is applied to a number of exchanges (exchange set). A facility is provided for defining and maintaining a library of exchange sets.

A linked PPC is a composite control and is defined by linking together a number of basic PPCs in a sequence to form a linked PPC. When the linked PPC is implemented, each PPC in the chain is implemented sequentially starting with the first.

Exchanges can be grouped together into exchange sets. Commonly used exchange set definitions may be stored in store 17 and used when defining broadcast controls. These are referred to as static exchange sets.

Exchanges can also be grouped by exchange type into dynamic exchange sets. The following default dynamic exchange sets are provided:

All DMSUs (Digital Main Switching Units: trunk exchanges)

All DCCEs (Digital Call Centre Exchange: tandem/junction exchange—intermediate level)

All DLEs (Digital Local Exchanges)

All DDSCs (Digital Derived Services Switching Centre)

All DJSUs (Digital Junction Switching Unit—intermediate level)

All dependent level exchanges of DMSU (one set per DMSU)

All dependent level exchanges of a DCCE (one set per DCCE)

Dependent level exchanges include DLEs, DJSUs and DCCEs.

A traffic control is scheduled to deal with a particular problem on the network. Users have two sources for PPCs when scheduling, namely PPCs stored in the network traffic control library; or by defining a control for the purpose, allowing users to schedule new controls rapidly without following the normal sequence of storing a control definition in the library and then retrieving it. The network manager will perform the same sequence of operations but this will be transparent to the user.

A network traffic control is applied to an exchange in two stages. It is defined using the facilities of the network traffic control library, and the schedule to be applied at specified times. The control could be applied immediately or stored for later application.

Both single-shot and multi-shot (repeating) schedules are provided:

single-shot where only one insertion land removal) is involved multi-shot where multiple insertions (and removals) are involved.

Scheduled controls may be named in such a way as to link them to specific events, e.g. Christmas Day.

A schedule may be specified without a removal time.

The single-shot timing mechanism provides the opportunity to define a period during which the traffic control should be applied. This is achieved in terms of a control insertion time, and a control removal time.

Figure 5:
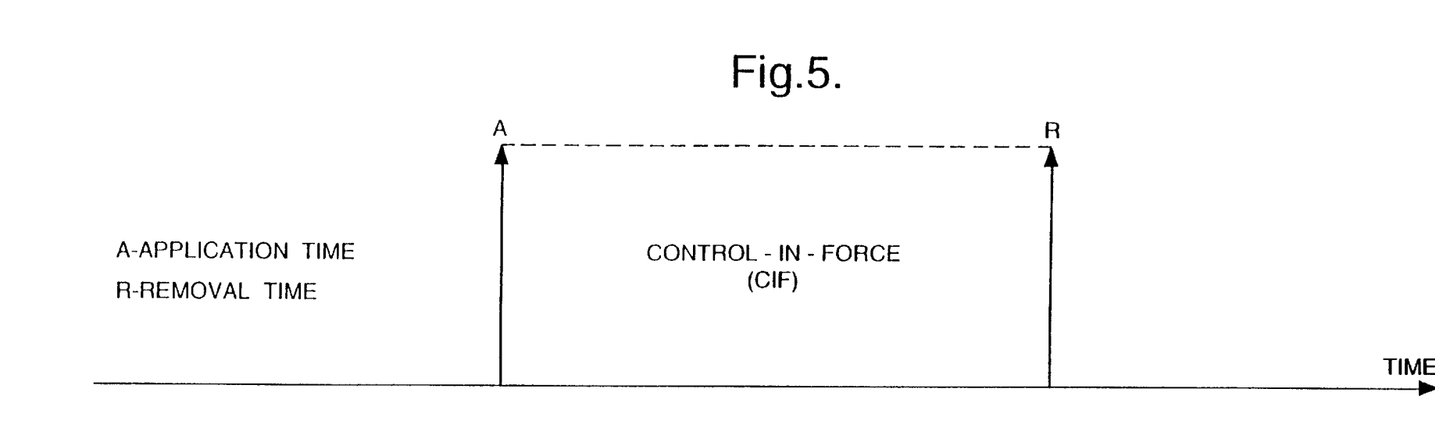
FIG. 5 shows an illustration of a single shot schedule operated according to the invention.

FIG. 5 provides an illustration of the type of schedule that may be achieved using a single-shot schedule. The hatched area represents the time over which the control is in force. 'A' represents the application time, and 'R' the removal time.

A control may be scheduled without a specified removal time; such a control is effective indefinitely. Facilities are provided to add later a removal time to the schedule; immediate removal is also possible.

The control insertion time is specified as a specific time e.g. 10:30 Nov. 14, 1994

The control removal time is specified in the same format as the insertion time, e.g. 13:15 Nov. 14, 1994 or it may be specified as a delta time (i.e. the control duration): e.g. 002 02.45

The delta time in the example means remove the control after an elapsed time of 2 days 2 hours and 45 minutes.

A multi-shot (repeating) schedule is a single-shot schedule but with the addition of a schedule start and end time and some repeating criteria (e.g. on Monday of every week)

The facility of multi-shot schedules provides the opportunity to define a repeating traffic control application pattern. The application pattern is defined in terms of:

a schedule start time;

a schedule end time;

a control inserting time (within the period specified by the schedule start and end time);

a control removal time (within the period specified by the schedule start and end time); and repeat criteria.

Figure 6:
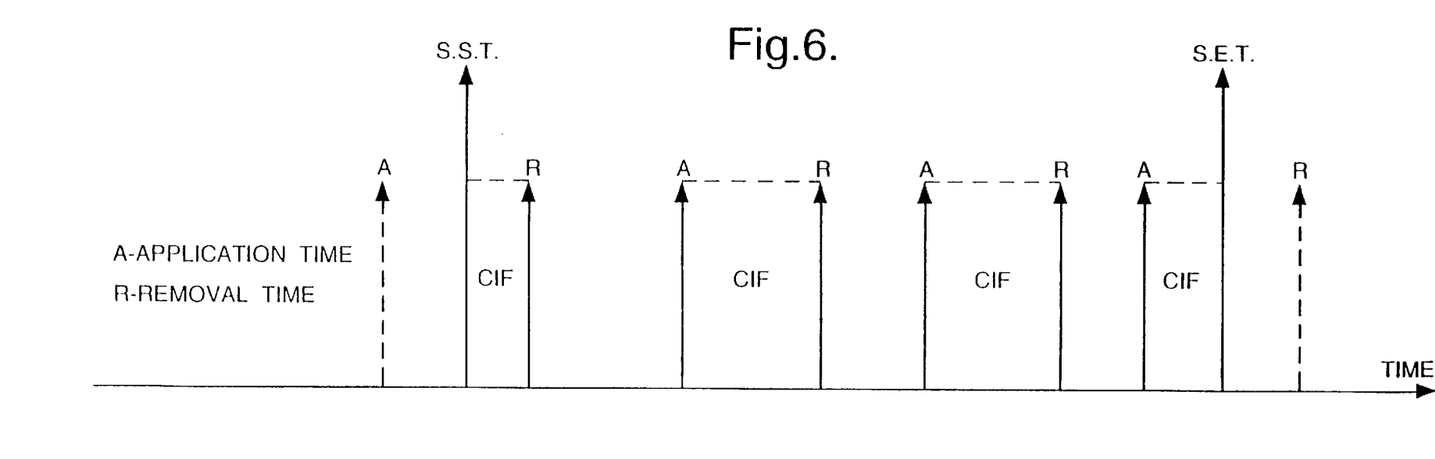
FIG. 6 shows an illustration of a multi-shot schedule operated according to the invention.

FIG. 6 provides an illustration of the type of schedule that may be achieved using a multi-shot schedule. The hatched area represents the time over which the control is in-force. It is possible for the control in-force period to span a midnight boundary (i.e. control removal occurs on a different day to control insertion). A control is removed when its associated schedule expires.

Note that the control is not applied until Schedule Start Time SST and is removed at Scheduled End Time SET, although these do not necessarily coincide with control insertion and removal times.

The scheduled start time SST, control insertion time A and control removal time R are specified in the same format as for the single shot control above.

The scheduled end time defines a time after which no further applications occur.

The scheduled end time is specified in one of the formats specified for the control removal time above.

The repeating criteria are identified in terms of:

days of the week, or days of the month (but not both), and calendar months of the year in which the above applies.

In the simplest case, a multi-shot schedule specifies a schedule start and end time and the days of the week or days of the month in which the control insertions and control removals apply within the specified schedule start and end time.

A more specialised repeating pattern based on the above can be defined, by further identifying the months within the specified schedule start and end time in which the control insertions and control removals apply.

It is possible for schedules to expire automatically, or be forced to expire by operator action.

In the case of a single-shot schedule, the schedule automatically expires on removal. For multi-shot schedules, automatic expiry occurs on the schedule end time.

After a control from the network traffic control library 20 is scheduled, the network manager maintains details of the scheduled control and will implement the control as specified in the schedule.

Figure 7:
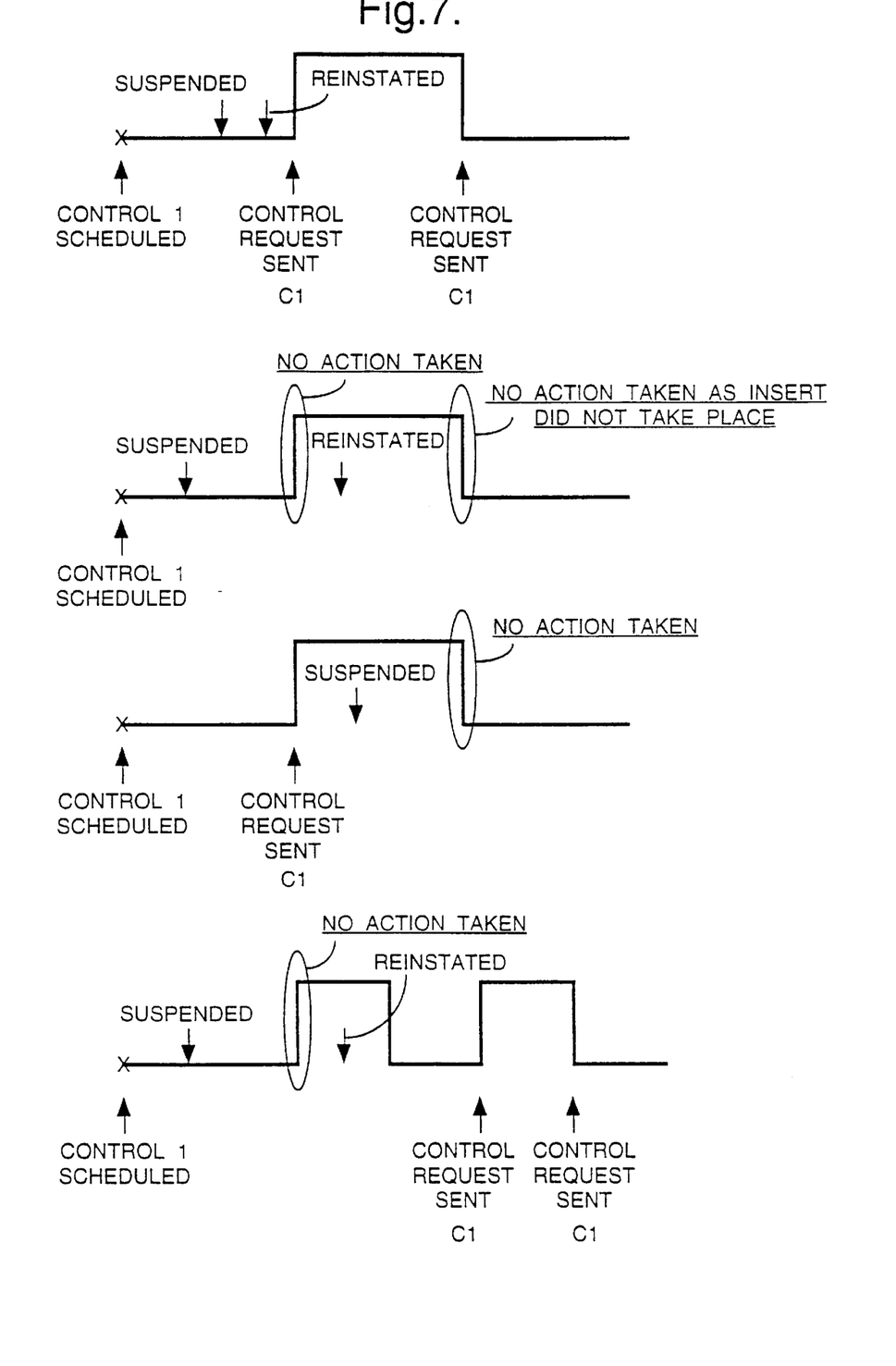
FIG. 7 shows how such scheduled controls can be implemented according to the invention.

A facility is provided to allow users to track and monitor the current list of scheduled controls on the network manager and to monitor which of the scheduled controls are in-force (active). FIG. 7 shows how scheduled controls are tracked by the network manager through the scheduled control and active control lists.

In the event of a scheduled control application failing, the application is periodically retried until it is successful or the end of the scheduling period has been reached. The number of retries and the retry interval are configurable parameters.

A message is sent to the human interface 12 if the network manager fails to implement a scheduled control after the maximum number of retry attempts or the end of the scheduling period has been reached.

The implementation of a scheduled control can fail for several reasons. Firstly there may be inconsistent scheduled requests or other reasons (failure within network manager). Secondly there may be communications failure.

There may also be communications failures, maintenance failures (e.g. failure to process a job request), or exchange failures (e.g. the exchange does not accept a control request from the network manager).

In the first two cases the network manager will continue to apply the retry logic as specified in order to attempt to successfully implement the control. However, in the event of an exchange failure the network manager will stop the retry logic as soon as an exchange fails to accept a control request.

Overlapping schedules can be allowed subject to any traffic control implementation rules defined in the network manager, as described below.

Before a control request is implemented the network manager checks if there is an existing control on the control target, and if so, the actual control requests issued by the network manager are modified. The rules specified below, are general rules to be applied when implementing controls.

The network manager may issue a real-time "control status read" request before applying a control.

For inserting a basic PPC (Single Exchange/Route and Exchange Set), the network manager checks for a control of the same type on the target (which may consist of members of an exchange set). If a control of the same type is already in force, and if the schedule creation date of the scheduled control is earlier than the in force control, the scheduled control is not implemented; otherwise the scheduled control is implemented.

The user is able to suspend scheduled controls, which may be authorised, prior to implementation. Suspended controls can be reinstated at any time, however a control will not be implemented if the scheduled insertion time has been exceeded. Multi-shot controls will be implemented until the next insertion time after the reinstatement.

Before inserting a Basic PPC (Single/Exchange/Route and Exchange Set) control the network manager may issue a request to read the real-time control status.

If a control is already in force on the exchange or the exchange resource already exists, but with different parameters to the control to be implemented, then a "change" exchange-specific command is issued; otherwise an "insert" exchange-specific command is issued.

The network manager may be arranged such that if it discovers a control of the same type and detects that it did not insert the discovered control, the network manager alerts users, updates the controls database and sends a message to the central system mailbox. The scheduled control will then only be applied if agreed by a user with the Control Authorisation access privilege, and otherwise will be removed.

When removing a Basic PPC (Single Exchange/Route and Exchange Set) the network manager checks for a scheduled control of the same type on the target (which may consist of members of an exchange set). If a control of the same type is scheduled and due to be enforce (but not implemented due to the application of the first rule above—see FIG. 7) the control is applied using the second rule above.

If no control of the same type is scheduled and due to be in-force, before implementing a remove control request the network manager issues a real-time control status read request.

If a control is already in-force on the exchange or the resource already exists a recover exchange specific command is issued.

For linked pre-planned controls, each PPC in the chain would only be implemented if the implementation of the previous PPC was successful. Implementation of constituent PPCs in the chain would be according to the rules specified above for PPCs. Removal of the PPCs in the chain is in the reverse order to that of insertion.

If one of the PPC constituents fails during implementation, then the effect of all previously implemented constituent PPCs in the chain would be reversed.

Scheduled controls which have been authorised are implemented by the network manager at the specified times. At the point of implementation, the network manager maps the generic control to an exchange-specific control if the generic control is a linked control then each individual control in the linked control is mapped to the exchange-specific format when the individual control is implemented. The network manager then transmits the control request(s) to the appropriate instruction generator 18a, 18b, or 18c for each exchange, and saves the corresponding control response(s) returned by the instruction generator 18. Finally, the network manager updates the internal control database with the new status of the control.

In general, a control may be inserted, removed, or cancelled. In addition control status read requests may be issued to obtain the status of a network resource prior to inserting or removing a control on it. The cancel request does not result in any control requests to the network communications manager.

Control responses are matched with the control requests to form a complete control transaction. Each control transaction corresponds to an insertion or removal of a scheduled control.

Network traffic management controls are instructions sent to an exchange via a Network Communications Manager) to modify exchange resources, with the purpose of overcoming problems existing on the network (e.g. by causing traffic to be re-routed).

Each equipment type (e.g. System X Phase 3) manages a different set of resources to perform its switching operations. However the network manager attempts to modify exchange resources on different exchange equipment types with the intention of modifying traffic patterns in similar ways.

In order that the network manager can interwork with a number of exchange equipment types, and allow additional equipment types to be added as the system evolves, without the system growing increasingly complex, a set of exchange-type independent Generic Controls is defined.

Some exchange-specific controls only appear on one particular equipment type or do not fit into the generic set. Facilities to create, schedule and manipulate these non-generic controls can be provided so that specific features offered only by one system, or specifically designed for a special requirement of one installation, are not lost despite not being generic to the system as a whole.

Each generic control stored on the network manager M has a defined set of parameters. The controller sends exchange specific control requests to the network elements when a scheduled control is implemented. The translators 15 convert generic controls stored in the network manager to exchange-specific versions at the point of implementation via a set of mapping rules.

When a user creates a Destination Volume Control such as call blocking, the network manager stores the values for the generic parameters defined for the control and not values for the exchange specific parameters. The exchange specific parameters are calculated according to a set of mapping rules at implementation time. A separate set of rules is required for each target equipment type.

Exchange specific parameters which cannot be calculated or derived from the generic parameters are assigned default values by the network manager. If however, a user creates the generic instruction knowing that the target(s) of the control includes exchanges having additional functionality, then values for the exchange-specific parameters, such as traffic category and call disposition, may be specified at control creation time.

Mapping rules are defined for each exchange specific control on each target equipment type supported by the control M.

In mapping the generic set of parameters to the exchange specific set, the mapping process will use the nearest available value for an exchange specific parameter if the required value is not available.

Non-generic controls such as System X Loopback can be stored and manipulated in their exchange specific form in the network manager. At implementation time, no mapping process is performed by the network manager and the control details are sent directly to the switches for implementation on the exchange.

What is claimed is:

1. A method of controlling a telecommunications network, the network comprising at least two groups of elements, wherein at least some of the elements of at least two of the groups are capable of performing a predetermined function in response to a group-specific instruction, the method comprising the steps of:

generating a generic instruction, for performance by a selected group of the elements there being a plurality of the elements in at least one selected group;

converting the generic instruction to group-specific instructions appropriate to each group of elements in which there is at least one of the selected elements; and transmitting to each selected element the group-specific instruction appropriate to its group.

2. A method as in claim 1 further comprising the steps of:

determining which selected elements are capable of performing the required instruction, and inhibiting the transmission of the instruction to all of the selected elements if any of said elements do not have the required capability.

3. A method as in claim 1 further comprising the steps of:

determining which of the selected elements are capable of performing the required instruction, and transmitting the instruction only to that element or elements.

4. A method as in claim 1 wherein instructions are prepared and stored for onward transmission in response to a predetermined condition.

5. A method as in claim 4, wherein the predetermined condition is the expiry of a time interval.

6. A method as in claim 5, wherein the time interval is reset after each transmission.

7. A method as in claim 5, wherein the time interval is not reset after the transmission.

8. A method as in claim 4, further comprising the steps of:

monitoring the telecommunications system for a predetermined operating condition, and generating the generic instruction if the said predetermined operating condition occurs.

9. A method as in claim 8, wherein the predetermined operating condition is a network overload.

10. A method as in claim 1 wherein the instruction causes the inhibition of a signalling function.

11. A method as in claim 1 further comprising the steps of:

generating a generic instruction in a high-level language;

generating a selection pattern, indicative of the elements to be controlled by the instruction;

generating an interface type message, indicative of whether any of the elements selected by the selection pattern are to carry out the instruction if other elements of those selected are incapable of performing the instruction;

converting the high-level instruction into one or more lower-level instructions, each having a format compatible with a respective group of the elements; and comparing the selection pattern output and interface type data with stored information to select the elements in each group to which each low-level instruction is to be transmitted.

12. A method as in claim 11 further comprising the additional steps of:

generating a message indicating whether, if some of the selected elements are unable to execute the instruction, the elements which are able to execute the instruction should do so, and inhibiting or executing the operation of the said elements in response to said message.

13. A controller for a telecommunications network, the network comprising at least two groups of elements, wherein at least some of the elements of at least two of the groups are capable of performing a predetermined function in response to a group-specific instruction, the controller comprising:

means for selecting a plurality of the elements, to which an instruction to perform the predetermined function is to be transmitted;

means for generating a generic instruction, for performance by the selected plurality of the elements;

means for converting the generic instruction to group-specific instructions appropriate to each of plural groups of elements in which there at least one of the selected elements; and means for transmitting to each selected element the group-specific instruction appropriate to its group.

14. A controller as in claim 13, in which the selection means comprises:

means for determining which groups, of those to which the selected elements are capable of performing the required instruction, and means for inhibiting the transmission of the instruction to all of the selected elements if any of said groups of elements do not have the required capability.

15. A controller as in claim 13, in which the selection means comprises:

means for determining which of the selected elements are capable of performing the required instruction, and means for transmitting the instruction only to that element or elements.

16. A controller as in claim 13, further including:

means for preparing and storing instructions, and means for transmitting the stored instructions in response to a predetermined condition.

17. A controller as in claim 16, further comprising:

a timing means, the transmitting means being arranged to transmit the instructions under the control of the timing means.

18. A controller as in claim 17, further including:

means for resetting the timing means after each transmission.

19. A controller as in claim 16, further comprising:

monitoring means for monitoring the telecommunications system for a predetermined operating condition, the transmitting means being responsive to the monitoring means to transmit the stored instructions if the said predetermined operating condition occurs.

20. A controller as in claim 19, the monitoring means being configured to detect network overloads.

21. A controller as in claim 13 further comprising:

a generic instruction generator for generating generic instructions in high-level language and for generating selection pattern data, indicative of the element to be controlled by the instruction;

a plurality of translators each configured to covert the high-level generic instructions generated by the generic instruction generator into an instruction in a format compatible with a respective element type; and a data matcher for comparing the selection pattern data generated by the generic instruction generator with information stored in a store, in order to select the switches to which the instruction is to be sent.

22. A controller as in claim 21, the generic instruction generator also having:

means for generating a message indicating whether, if some of the selected elements are unable to execute the instruction, the elements which are able to execute the instruction should do so, and means for inhibiting or executing the operation of the elements in response to said message.

23. A telecommunications network comprising a controller as in claim 13, in combination with one or more network elements, at least some of the network elements having:

means for isolating a network signalling function; and means to activate the isolating means in response to an instruction transmitted from the controller.

* * * * *